United States Patent [19]
Yoshitani et al.

[11] Patent Number: 5,268,975
[45] Date of Patent: Dec. 7, 1993

[54] OPTICAL FIBER SWITCHING SYSTEM FOR LASER WELDING

[75] Inventors: Katsumi Yoshitani, Hirakata; Fumihiro Kasano, Sakai; Hiromi Nishimura, Takatsuki; Hideki Fukuzono, Nara; Tsutoma Shimomura, Osaka, all of Japan

[73] Assignee: Matsushita Electric Works, Ltd., Osaka, Japan

[21] Appl. No.: 872,758

[22] Filed: Apr. 24, 1992

[30] Foreign Application Priority Data

| Apr. 26, 1991 | [JP] | Japan | 3-97222 |
| Jun. 25, 1991 | [JP] | Japan | 3-48001[U] |
| Oct. 15, 1991 | [JP] | Japan | 3-265627 |
| Feb. 3, 1992 | [JP] | Japan | 4-17256 |

[51] Int. Cl.$^5$ ............................................. G02B 6/26
[52] U.S. Cl. ............................... 385/22; 385/16
[58] Field of Search ............... 385/22, 16, 17, 18, 385/19, 20, 21, 22, 23; 219/121.63, 121.64

[56] References Cited

U.S. PATENT DOCUMENTS

| 4,220,396 | 9/1980 | Antell | 385/20 |
| 4,337,995 | 7/1982 | Tanaka et al. | 385/21 |
| 4,452,507 | 6/1984 | Winzer | 385/21 |
| 4,610,504 | 9/1986 | Thurenhius et al. | 385/20 |
| 4,699,457 | 10/1987 | Goodman | 350/96.20 |
| 4,787,692 | 11/1988 | Spanke | 385/17 |
| 4,815,803 | 3/1989 | Faulkner et al. | 385/17 X |
| 4,925,265 | 5/1990 | Rink et al. | 350/96.18 |
| 5,000,532 | 3/1991 | Kraetsch et al. | 350/96.20 |

FOREIGN PATENT DOCUMENTS

| 56-27103 | 3/1981 | Japan . | |
| 57-24522 | 5/1982 | Japan . | |
| 0056328 | 3/1986 | Japan | 385/17 |
| 62-58483 | 12/1987 | Japan . | |
| 1266523 | 3/1972 | United Kingdom . | |
| 1426475 | 2/1976 | United Kingdom . | |

*Primary Examiner*—John D. Lee
*Assistant Examiner*—Phan T. Heartney
*Attorney, Agent, or Firm*—Stevens, Davis, Miller & Mosher

[57] ABSTRACT

A switching system for selectively distributing a laser beam from a laser source to one of a plurality of welding stations for laser welding thereat. The system includes a first optical fiber directing the laser beam therethrough, and a pair of second optical fibers leading to the welding stations, respectively. A switching device connects the first optical fiber selectively to one of the second optical fibers so as to pass the laser beam to the corresponding welding station for enabling the laser welding thereat. The switching device comprises a housing having a longitudinal axis and holding input ends of the second optical fibers in parallel relation with the longitudinal axis, a carrier supporting an output end of the first optical fiber and linearly movable together therewith within the housing in a direction perpendicular to the longitudinal axis such that the output end of the first optical fiber comes into and out of closely end-to-end facing relation to the input ends of the second optical fibers. An electromagnetic relay is included to have an armature which is movable between two positions and operatively connected to move the carrier for aligning the output end of the first optical fiber to the input end of a selected one of the second optical fibers for passing the laser beam to the selected one of the second optical fibers. The output and input ends of the optical fibers are each provided on with a heat-radiating sleeve for dissipation of heat.

13 Claims, 16 Drawing Sheets

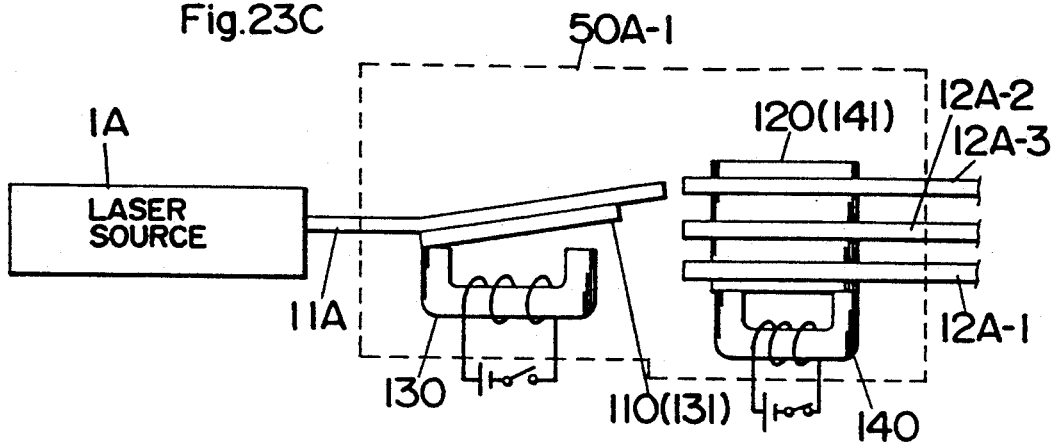
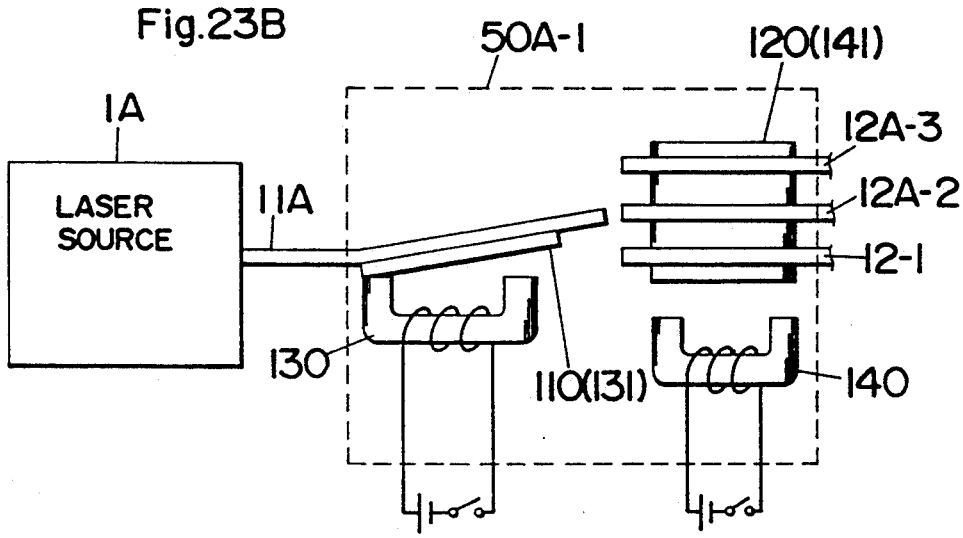
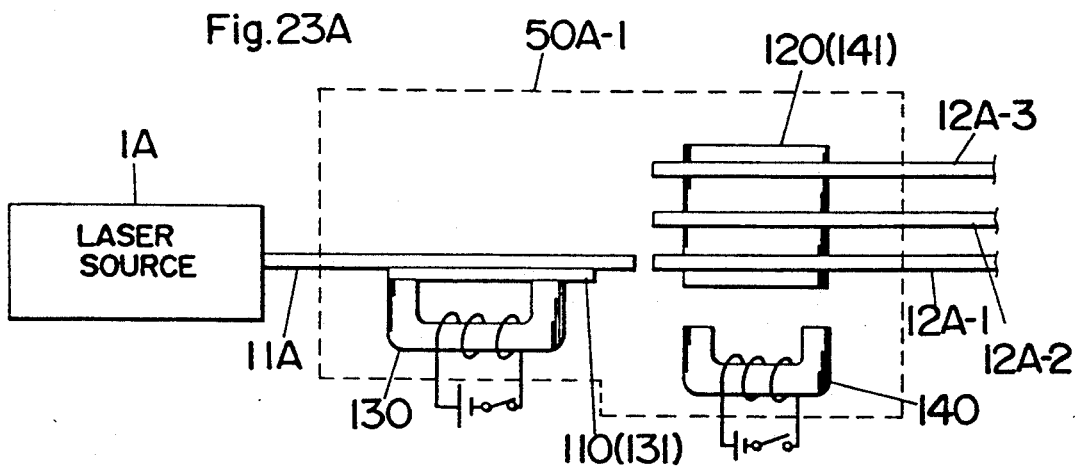

OPTICAL FIBER SWITCHING SYSTEM FOR LASER WELDING

BACKGROUND OF THE INVENTION

1. Field of the Invention

The present invention is directed to an optical fiber switching system for laser welding, and more particularly to such a system for selectively distributing a laser beam from a source of laser to one of a plurality of welding stations for effecting a laser welding thereat.

2. Description of the Prior Art

In order to effect a laser welding at different work stations by a common laser beam generated from a laser source, it has been proposed to distribute the laser beam selectively through a plurality of optical fibers leading to the individual work stations. One prior art system is shown in FIG. 25, which has a switching device 250 comprising a plurality of mirror units 251 arranged in a row on the side of a laser source 200 and connected to different work stations WS respectively through corresponding optical fibers 210. Each of the mirror units 251 includes a mirror 252 which is controlled to move between an operative position for reflecting a laser beam LB from the laser source 200 to the corresponding optical fiber 210 and an inoperative position for passing the laser beam LB to the next mirror unit 251. Another prior art system is shown in FIG. 26, which includes a switching device or distributor 260 with a plurality of output terminals 261 which are connected to individual work stations WS through a corresponding number of optical fibers 210. The distributor 260 is mounted on the side of the laser source 200 and includes a rotor 262 with a mirror which is driven by a motor to reflect the laser beam LB selectively to one of the output terminals 262. In these system, however, the switching device adds an extra volume or bulk to the laser source, thereby making it space-consuming and less convenient for installation within a limited space. Also because of that the switching devices are mounted on the side of the laser source, the optical fibers are all required to be extended from the installation site of the laser source over an entire distance to the individual work stations, necessitating unduly long total length for the optical fibers. Further, the former system of FIG. 25 is expected to operate only at a slow switching rates, such as less than 10 MHz and it is difficult to obtain a higher switching rate operation due to the fact that the mirror 252 must move through a rather great distance between the operative and inoperative positions. While on the other hand, the latter system of FIG. 26 is capable of a high switching rate operation, as high as 40 MHz by controlling the motor. Nevertheless, the system is found to inherently suffer from different switching time between switching the laser beam from one of the output terminals to the adjacent terminal and to a remote terminal, thereby failing to effecting switching at a constant rate to all of the optical fibers. To solve the above problems while retaining a high switching operation, it is assumed to utilize a switching device which is connected to the laser source through a single optical fiber and to the individual work stations through a corresponding number of optical fibers so that the switching device can be mounted separated away and independently from the laser source. The switching device may comprise a relay with an armature having two positions which is connected to move the optical fibers extending from the laser source between two position for selectively connecting it to one of the optical fibers leading to the work stations. Such a switching device, by itself, is know in the art of a fiber optical communication system as, for example, disclosed in U.S. Pat. Nos. 4,337,995, 4,452,507, and 4,610,504. However, since the switching device for the fiber optical communication deals only with a light of very small energy, such switching device is not directly transferable to the optical fiber switching system for laser welding where the light energy is so great that heat protection becomes of major concern for safely switching the laser beam to a selected one of the work stations through the corresponding optical fibers.

SUMMARY OF THE INVENTION

The above problems and insufficiencies have been eliminated in the present invention which provides an optical fiber switching system for laser welding. The system in accordance with the present invention is provided to selectively distribute a laser beam to one of a plurality of welding stations to effect a laser welding thereat. The system comprises a laser source generating the laser beam, a first optical fiber extending from the laser source to direct the laser beam therethrough, a pair of second optical fibers leading to the individual work stations, and a switching device for connecting the first optical fiber to a selected one of the second optical fibers so as to pass the laser beam to the selected second optical fiber for enabling the laser welding at the corresponding welding station. The first optical fiber has an output end which is selectively aligned with one of input ends formed at the adjacent ends of the second optical fibers. The switching device comprises a housing having a longitudinal axis and holding the input ends of the second optical fibers in parallel relation with the longitudinal axis. A carrier is received within the housing to support the output end of the first optical fiber and is linearly movable together with the output end within the housing in a direction perpendicular to the longitudinal axis such that the output end of the first optical fiber comes into and out of closely end-to-end facing relation to the input ends of the second optical fibers. Also included in the switching device is an electromagnetic relay having an armature movable between two positions. The armature is operatively connected to move the carrier linearly for aligning the output end of the first optical fiber to the input end of a selected one of the second optical fibers, thereby directing the laser beam from the first optical fiber only through the selected one of the second optical fibers to the corresponding work stations. The output end of the first optical fiber and the input ends of the second optical fibers are each covered with a heat-radiating sleeve for dissipation of heat given off at the connection between the first and second optical fibers. The heat-radiating sleeve is preferably made of a ceramic or rigid metal having a superior heat conductivity. Therefore, it is readily possible to absorb at the connection the heat associated with the laser beam of relatively great energy generated for the welding purpose, enabling the switching system to operate safely. Additionally, the system is capable of mounting the switching device away from the laser source to make the laser source compact readily installed within a limited space, to reduce the total route length of the optical fibers from the laser source to the individual work stations, and to permit a flexible arrangement of the laser source and the work stations. Also, the system can effect a high speed switching operation due to the employment of the electromagnetic relay and at the same time of effecting the laser beam switching with a minimum loss of energy due to the fiber-to-fiber interconnection in contrast to the prior laser welding switching system with the use of the mirror.

Accordingly, it is a primary object of the present invention to provide an optical fiber switching system for laser welding which is capable of dissipating the heat possibly given off at the interconnection of the optical fibers to effect safe switching operation, yet assuring a high speed switching operation and permitting a flexible arrangement of the laser source and the work stations.

In a preferred embodiment, an adjustor is included for adjusting an optical axis of the first optical fiber in coincidence with that of the destined second optical fiber. In order to facilitate the adjustment, the heat-radiating sleeve is formed in its end with notches through which a core of the corresponding one of the first and second optical fibers can be viewed.

It is therefore another object of the present invention to provide an optical fiber switching system for laser welding in which the aligning adjustment of the optical fibers can be made easily and correctly.

Preferably, the first and second optical fibers are formed on end faces at the output and input ends respectively with antireflection coatings having an optical thickness which is equal approximately to a multiple of a one-fourth wavelength of the laser beam. The coating comprises a layer of dielectric material and a layer of a metal oxide. With this antireflection coating, the laser beam can be passed from the first optical fiber to the second optical fiber with a minimum loss of energy, which is therefore a further object of the present invention.

The system includes a controller to enable and disable the generation of the laser beam at the laser source. Associated with the controller is a hazard sensor which is mounted within the switching device to detect a leakage of the laser beam at the connection between the first and second optical fibers. Upon detection of the laser beam leakage, the hazard sensor issues a hazard signal indicative of the leakage. The controller responds to the hazard signal by disabling the laser source so as to cease generating the laser beam, thereby assuring a safe switching operation, which is therefore a still further object of the present invention.

The system also includes at least one shutter for interrupting the laser beam and a position detector for detecting the position of the armature of the relay and providing to the controller a change-over signal indicative of that the armature completes a change-over from one position to the other. The shutter is controlled such that it is opened only when the hazard signal is not received and at the same time that the change-over signal is received. With this arrangement, the laser beam is allowed to directed to the destined work station only after the switching is completed and when there is no leakage of the laser beam, thereby successfully passing the laser beam to the destined work station without causing undesirable leakage in a directing path of the laser beam and also at the work station. The shutter may be provided at each of the work stations.

It is therefore a still further object of the present invention to provide an optical fiber switching system for laser welding in which the shutter or shutters are controlled to prevent the leakage of the laser beam in the directing path of the optical fibers and at the destined work station.

In another embodiment, the switching device is arranged to selectively connect the first optical fiber to one of three second optical fibers. To this end, the switching device includes a first carrier supporting the output end of the first optical fiber and linearly movable within the housing in a direction perpendicular to the longitudinal axis and a second carrier supporting the input ends of said second optical fibers in parallel relation to each other and linearly movable together therewith within the housing in a direction perpendicular to the longitudinal axis. The input ends of the second optical fibers are arranged in an evenly spaced relation within a horizontal plane. The first and second carriers are operatively connected to first and second electromagnetic relays with armatures so as to move the first and second carriers between the two positions, respectively. At one of the two positions of the first carrier, the output end of the first optical fiber comes into closely end-to-end facing relation selectively to the output end of one of the two adjacent second optical fibers. Likewise, at the other position of the first carrier, the output end of the first optical fiber comes into closely end-to-end facing relation selectively to the output end of one of the other two adjacent second optical fibers. Whereby, it is possible to connect the first optical fiber selectively to one of the three second optical fibers by combination movement of the first and second carriers.

It is therefore a still further object of the present invention to provide an optical fiber switching system for laser welding in which the switching device alone can effect three-way switching of the laser beam.

In a further embodiment, the switching device is configured to selectively connect the first optical fiber to one of four second optical fibers. The switching device includes a first carrier supporting the output end of the first optical fiber and linearly movable within the housing in a direction perpendicular to the longitudinal axis, and includes a second carrier supporting the input ends of the second optical fibers in such a manner that the input ends are arranged in two parallel rows each composed of two second optical fibers. A first electromagnetic relay with an armature is connected to move the first carrier between two horizontal positions. A second electromagnetic relay with an armature is connected to move the second carrier between two vertical positions in a direction perpendicular to the longitudinal axis and perpendicular to a plane in which the first carrier moves. At each one of the two vertical positions of the second carrier, the input end of each of the second optical fibers comes into closely end-to-end facing relation selectively to the output end of the first optical fiber in each, of its horizontal positions, thereby permitting direction of the laser beam selectively to one of the four second optical fibers from the first optical fiber.

It is therefore a still further object of the present invention to provide an optical fiber switching system for laser welding in which the switching device can alone effect four-way switching of the laser beam.

These and still other objects and advantageous features of the present invention will become more apparent from the following description of the preferred embodiments when taken in conjunction with the attached drawings.

BRIEF DESCRIPTION OF THE DRAWINGS

FIGS. 23A to 23C are schematic views illustrating the operation of the above switching device for selective connection of a first optical fiber to three second optical fibers;

DETAILED DESCRIPTION OF THE EMBODIMENTS

First embodiment <FIGS. 1 to 16>

Figure 1:
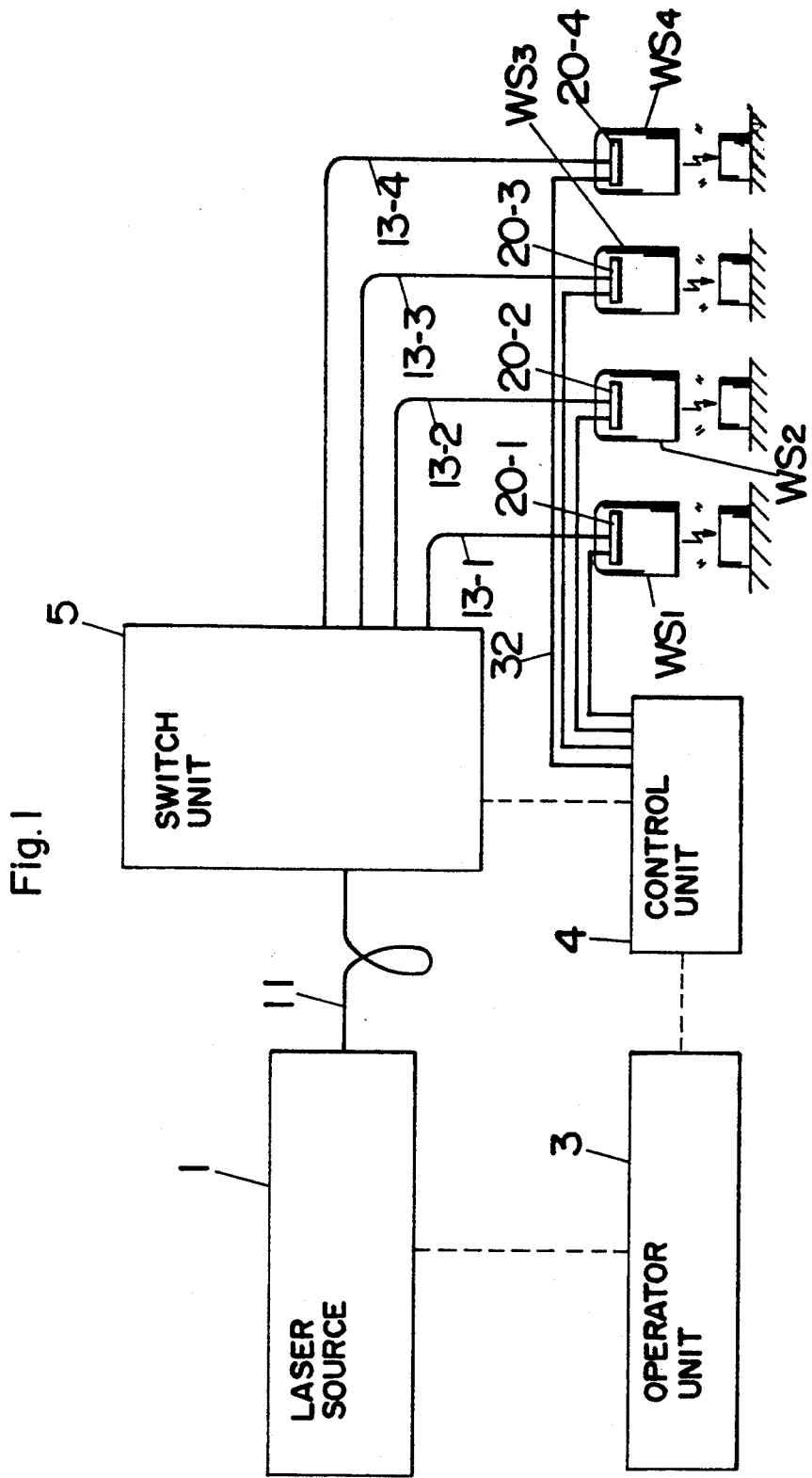
FIG. 1 is a schematic diagram illustrating an optical fiber switching system for laser welding in accordance with a first embodiment of the present invention.
Figure 2:
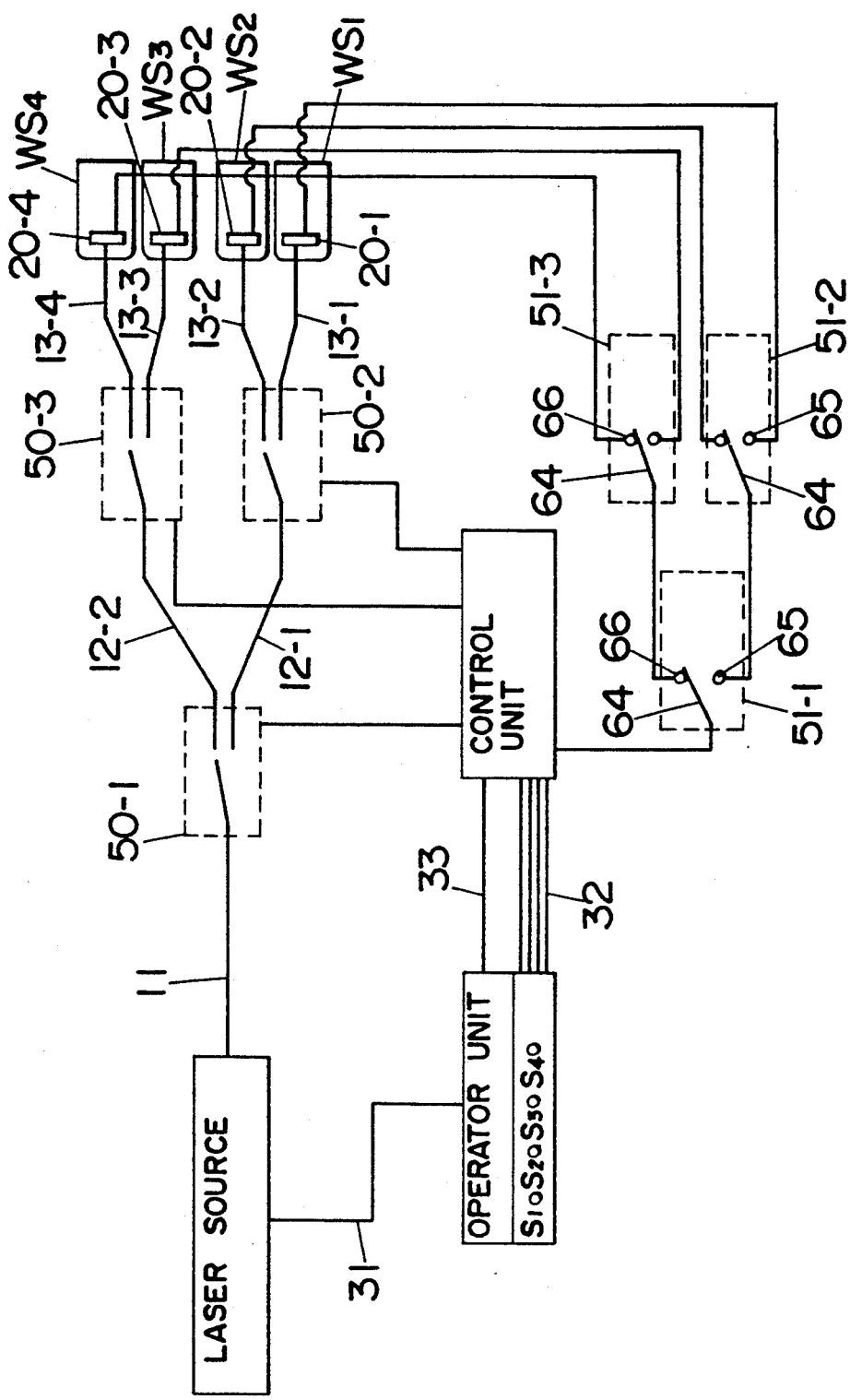
FIG. 2 is a schematic diagram illustrating in more detail the above system.

Referring now to FIGS. 1 and 2, there is shown an optical fiber switching system for laser welding in accordance with a first embodiment of the present invention. The system includes a laser source 1 generating a laser beam of energy great sufficient to effect laser welding. The laser source 1 is connected to four different work stations or welder guns $WS_1$ to $WS_4$ through a switch unit 5 so as to enable the laser welding at any one of the work stations $WS_1$ to $WS_4$ by the laser beam commonly directed from the laser source 1. The switch unit 5 is controlled from an operator unit 3 through a controller unit 4 to distribute the laser beam selectively to any one of the four work stations $WS_1$ to $WS_4$. The switch unit 5 is connected to receive the laser beam from the laser source 1 through a first optical fiber 11 and includes three switching devices (herein after referred to simply as switches) 50-1 to 50-3 each making two-way switching, as shown in FIGS. 2 and 3.

The operator unit 3 includes four selectors $S_1$ to $S_4$ corresponding to the work stations $WS_1$ to $WS_4$ for enabling the laser welding at any one of the work stations $WS_1$ to $WS_4$. To this end, the operator unit 3 is connected through a line 31 to the laser source 1 for energizing it to generate the laser beam and also connected through lines 32 to the control unit 3 for activating a suitable combination of the switches 50-1 to 50-3 for directing the laser beam to one of the destined work stations $WS_1$ to $WS_4$. The operator unit 3 is also connected through a line 33 to the control unit 4 in order to disable the laser source from a signal that is fed back through the line 33 from the control unit 4 when the signal is indicative that the switching has not been completed to the destined work station, the detail of which will be discussed hereinafter.

Figure 3:
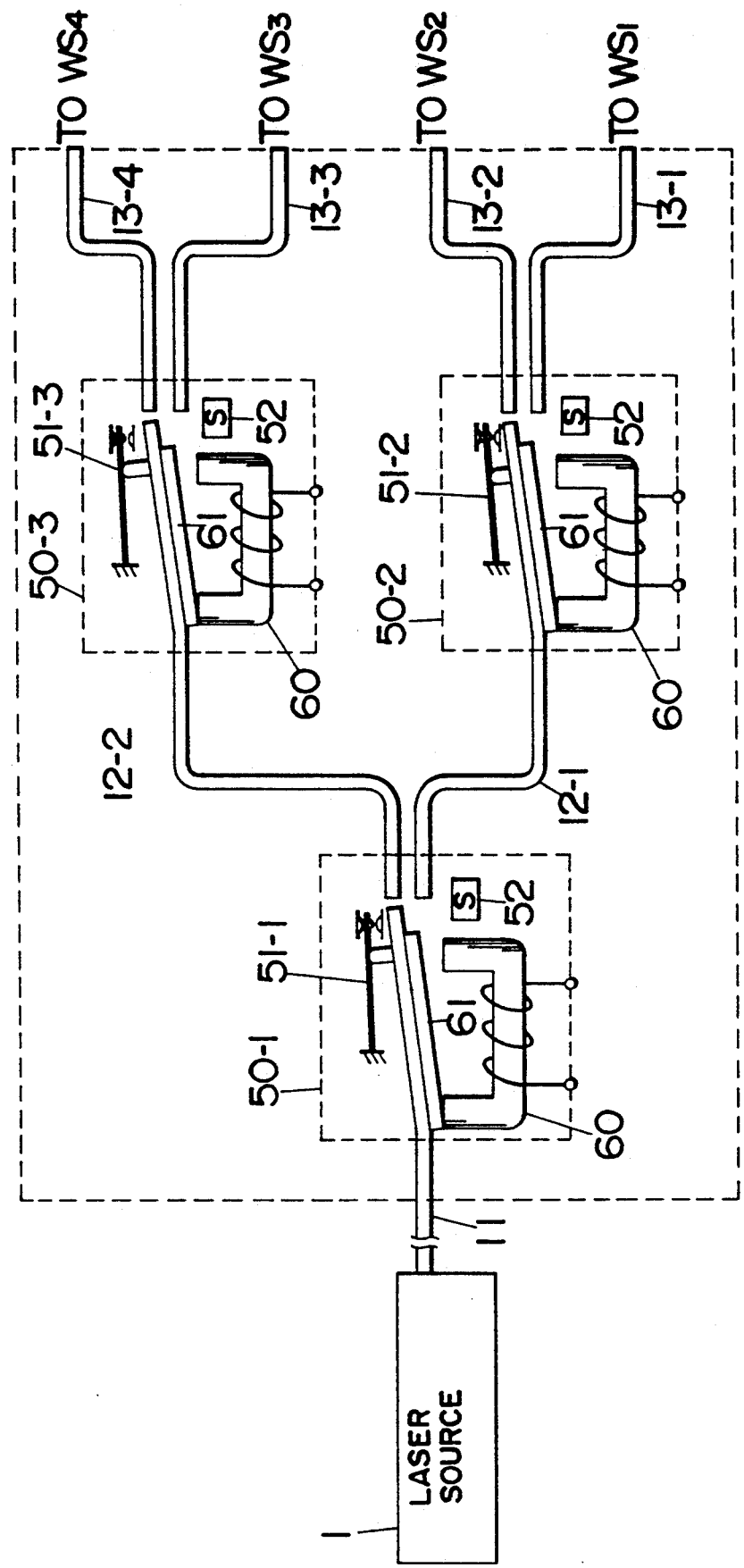
FIG. 3 is a schematic diagram illustrating a switching unit employed in the above system.

Within the switch unit 5, the three switches 50-1 to 50-3 of the identical configuration are arranged in a cascade connection to feed the output of the primary switches 50-1 to the inputs of the secondary switches 50-2 and 50-3, as shown in FIGS. 2 and 3. The primary switch 50-1 has its input connected to the laser source 1 by way of the first optical fiber 11 and has two outputs connected to the inputs of the secondary switching devices 50-2 and 50-3, respectively through second optical fibers 12-1 and 12-2. The secondary switches 50-2 and 50-3 have their outputs connected to the individual work stations $WS_1$ to $WS_4$ respectively through third optical fibers 13-1 to 13-4. As shown in FIG. 3, each of the switches includes an electromagnetic relay 60 with an armature 61 which is movable between two positions. In the primary switch 50-1, the armature 61 is connected to an output end of the first optical fiber 11 to be movable together therewith between the two positions. Disposed in closely adjacent relation to the output end of the first optical fiber 11 are input ends of the second optical fibers 12-1 and 12-2 which are held stationary so that the output end of the first optical fiber 11 is connected selectively to one of the input ends of the second optical fibers 12-1 and 12-2 dependent upon the position of the armature 61. Likewise, in the secondary switching device 50-2 and 50-3, the output ends of the second optical fibers 12-1 and 12-2 are connected respectively to the armatures 61 of the secondary switches 50-2 and 50-3 so as to be each movable between the two positions. Also, in each of the secondary switches 50-2 and 50-3, a pair of third optical fibers 13-1 and 13-2 (13-3 and 13-4) are disposed to have their input ends in closely adjacent relation to the output end of the second optical fiber 12-1 (12-2) for selective connection of the second Optical fiber 12-1 (12-2) to one of the third optical fibers 13-1 and 13-2 (13-3 and 13-4). The four third optical fibers 13-1 to 13-4 are connected respectively to the work stations $WS_1$ to $WS_4$. Thus, the switch unit 5 operates to distribute the laser beam selectively to any one of the work stations $WS_1$ to $WS_4$ by changing the positions of the primary switch 50-1 and the associated one of the secondary switches 50-2 and 50-3 under the control of the control unit 4. For example, when the selector $S_1$ of the operator unit 3 is turned on, the control unit 4 responds to operate the armatures 61 of the primary switch 50-1 and the secondary switch 50-2 for establishing a laser beam path from the laser source 1 through the first optical fiber 11, second optical fiber 12-1, and third optical fiber 13-1, to the work station $WS_1$. In the like manner, the laser beam path is established through the first, second and third optical fibers to a desired one of the work stations 2-2 to 2-3 in response to the selective turn-on of the selectors $S_2$ to $S_4$.

The switches 50-1 to 50-3 are provided respectively with contact sets 51-1 to 51-3 which are interlocked to the corresponding armatures 61 to open and close in response to the armature movement and which provide to the controller unit 4 position signals indicative of the position of the armature 61 or the output end of the corresponding fiber. Also incorporated in each of the switches 50-1 to 50-3 is a hazard sensor 52 which is disposed adjacent to the connection between the output and input ends of the optical fibers for detection of leakage of the laser beam thereat and issues to the control unit 4 a hazard signal upon detection of the leakage. In response to the hazard signal, the control unit 4 controls the operator unit 3 to immediately cease generating the laser beam at the laser source 1. Such leakage would arise when the output and input ends of the fibers are misaligned or when one or both of the input and output ends are damaged. The hazard sensor 52 may be a temperature sensor such as a thermistor and a thermostat detecting unusual temperature rise resulting from the leakage of the laser beam or a light sensor such as photodiode detecting the leakage of the laser. As shown in FIGS. 1 and 2, the work stations $WS_1$ to $WS_4$ are provided respectively with shutters 20-1 to 20-4 which are activated through a suitable combination of the contact sets 51-1 to 51-3 under the control of the control unit 4 to move between a closed position of interrupting the laser beam and an open position of passing the laser beam toward a target object.

Operation of the system will be now discussed with reference to FIG. 2 and FIGS. 16A to 16H illustrating waveforms of control signals. For example, when it is intended to destine the work station $WS_4$ from the work station $WS_1$, the selector $S_1$ is turned off and at the same time the selector $S_4$ is turned on, providing to the control unit 4 through corresponding lines 32 switch signals $SS_1$ and $SS_4$ going low and high, respectively, as shown in FIGS. 16A and 16B. Upon receiving such signals, the control unit 4 responds to set a ready signal RD going low, as shown in FIG. 16G. The low going ready signal RD is fed back through the line 33 to the operator unit 3 which in turn sets a laser control signal LS to a low level, as shown in FIG. 6H. The low going signal LS is fed to the laser source 1 through the line 31 to cease generating the laser beam. It is noted here that any one of the selector $S_1$ to $S_4$ is turned on at the operator unit 3, the control unit 3 responds to set the ready signal RD to a low level. After a short interval from the time of receiving the switch signals $SS_1$ and $SS_4$, the control unit 4 responds to provide relay signals $RY_1$ and $RY_4$, as shown in FIGS. 16C and 16D, to energize the relays of the corresponding switches 50-1 and 50-3 to change the positions of the corresponding armatures 61 or the output ends of the first optical fiber 11 and the second optical fiber 12-2. When completing the change-over of the individual armatures 61 of the switches 50-1 and 50-3 from one position to the other positions, the corresponding contact sets 51-1 and 51-3 are caused to change the respective conditions, thereby providing position signals $PS_1$ and $PS_4$, as shown in FIGS. 16E and 16F, for closing the shutter 20-1 and opening the shutter 20-4. Then, the control unit 4 operates in a delayed fashion to set the ready signal RD to a high level, as shown in FIG. 16G, which signal RD is fed back to the operator unit 3 to thereby set the laser control signal LS to a high level, as shown in FIG. 16H, and therefore resume generating the laser beam. Thus, the laser beam is allowed to be directed through the first optical fiber 11, second optical fiber 12-2 and the third optical fiber 13-4 for intended laser welding at the destined work Station $WS_4$. In this embodiment, the shutters are provided in the individual work stations, however, like shutter or shutters may be positioned in the laser source or in the switch unit.

Figure 4:
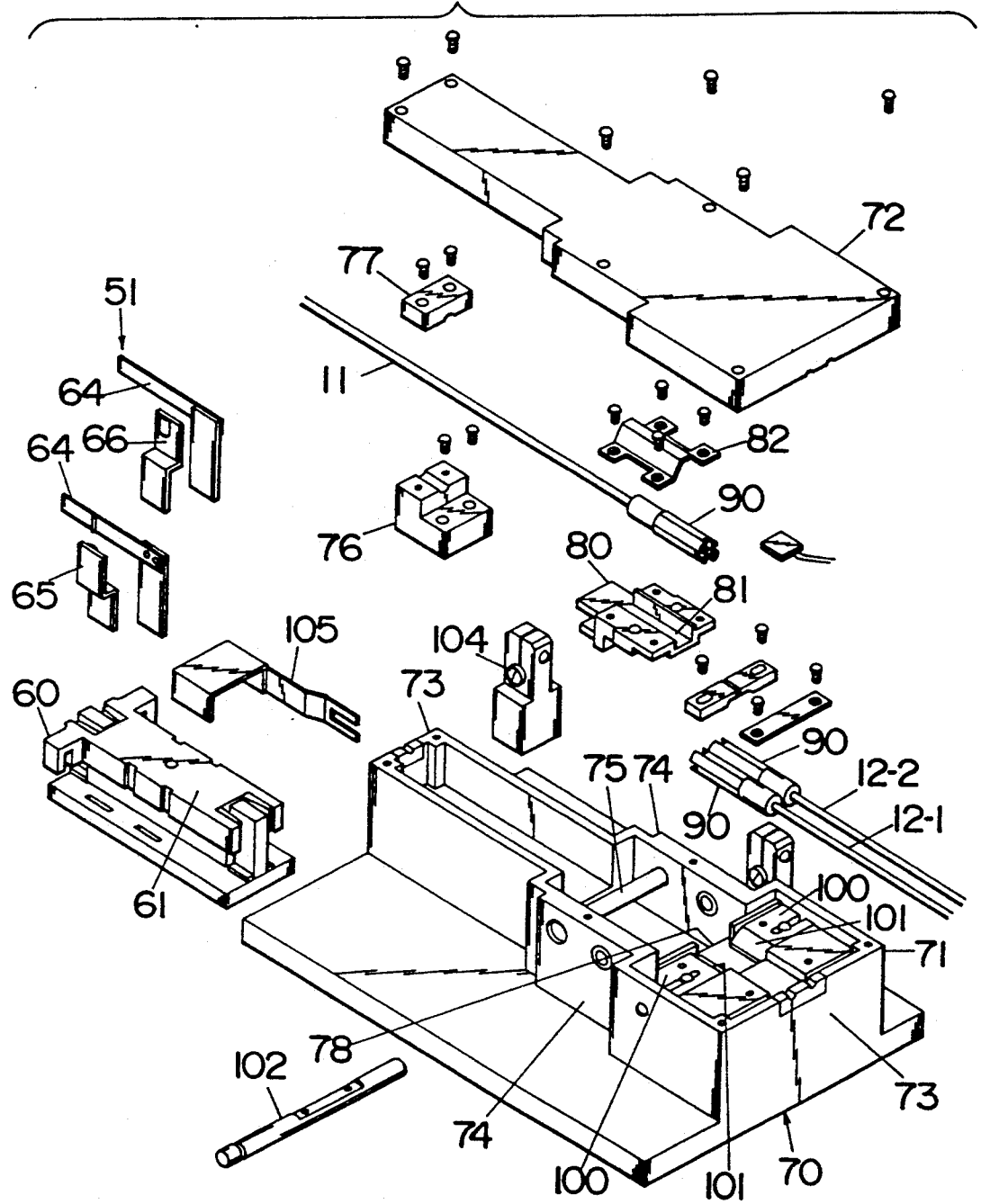
FIG. 4 is a perspective view of a switching device included in the above switching unit.
Figure 5:
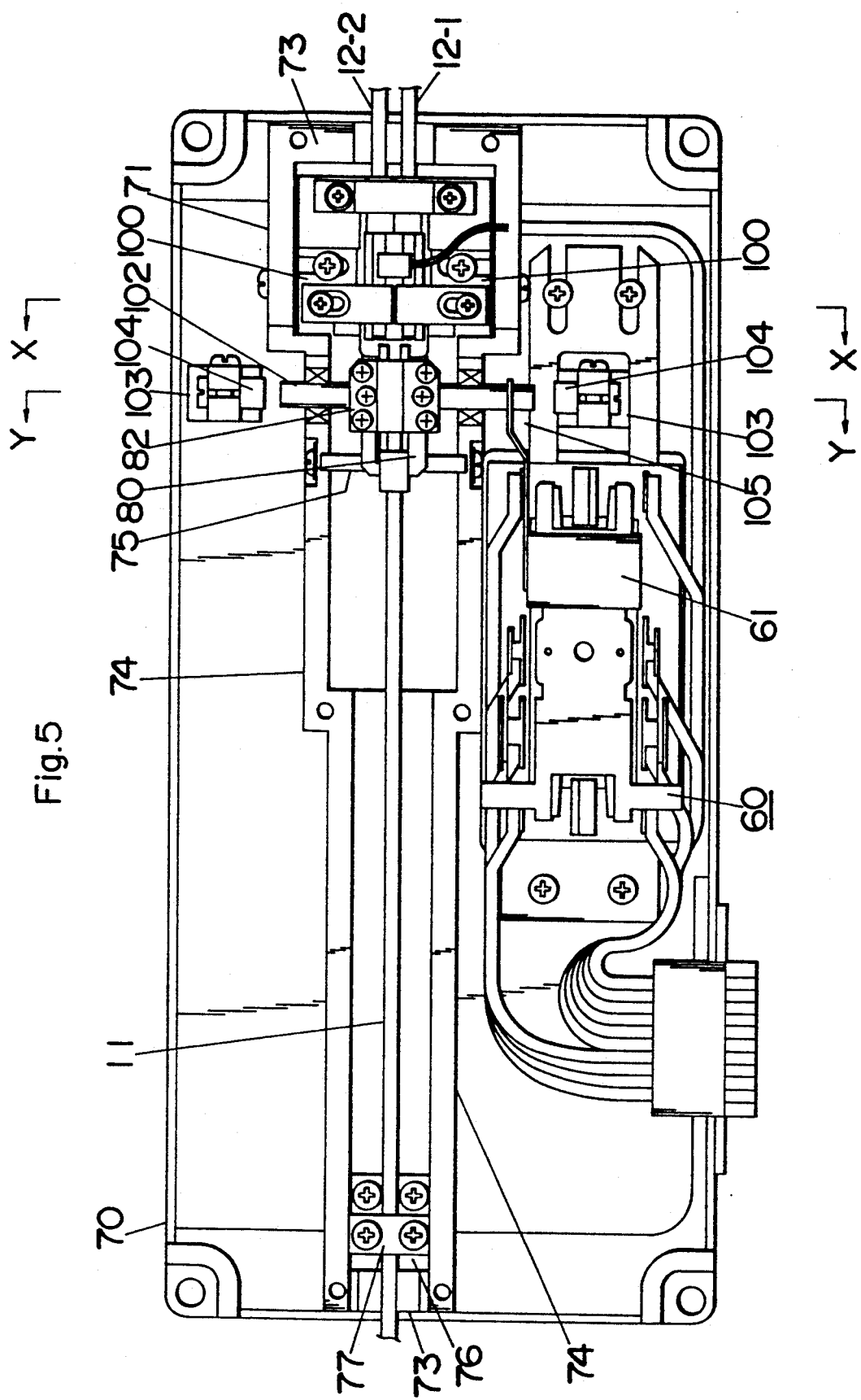
FIG. 5 is a top view of the switching device with a top cover removed.
Figure 6:
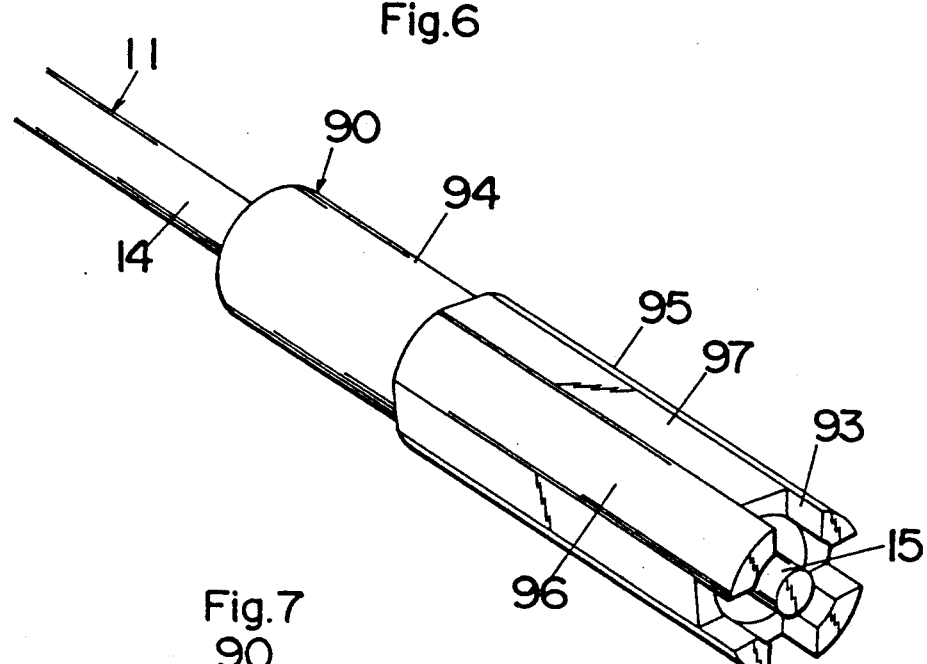
FIG. 6 is a perspective view illustrating a heat-radiating sleeve fitted around an output end of a first optical fiber extending from a laser source of the above system.

Referring to FIGS. 4 and 5, each of the switches 50-1 to 50-3 comprises a sealed housing 70 composed of a top-opened casing 71 and a top cover 72. The casing 71, which is made of a material exhibiting good heat dissipation as well as high reflectivity to the laser beam, is elongated to have a longitudinal axis and define therein an elongated space surrounded and defined by a pair of end walls 73 and a pair of side walls 74. Accommodated within the casing 71 is a carrier 80 which is supported by a horizontally extending transverse shaft 75 to be movable therealong. It is by this carrier 80 that the output end of the first optical fiber 11 or that of the second optical fiber 12-1 and 12-2 is supported to be movable together therewith. For simplicity and avoiding duplicate explanations, the switch structure is explained hereinafter only with regard to the primary switch 50-1 for selective connection between the first optical fiber 11 and the second optical fibers 12-1 and 12-2 since all the three switches 50-1 to 50-3 are of identical structure. The output end of the first optical fiber 11 is fitted with a heat-radiating sleeve 90 and is received within a slot 81 formed in the carrier 80 and is fixed thereto by a clasp 82. The first optical fiber 11 is also fixed to one longitudinal end of the casing 71 at a distance spaced from the fixing point to the carrier 80 by means of a clamp composed of a block 76 fixed to the casing 71 adjacent the end wall 73 and a retainer 77 so that the first optical fiber 11 is allowed to flex within the distance as the output end thereof moves horizontally. The input ends of the second optical fiber 12-1 and 12-2 are also fitted with like heat-radiating sleeves 90, respectively and are secured to the other longitudinal end of the casing 71 in a close relation to each other and in parallel with the longitudinal axis of the casing 71 so that the output end of the first optical fiber 11 comes into closely face-to-face relation selectively to one of the input ends of the second optical fibers 12-1 and 12-2.

Figure 12:
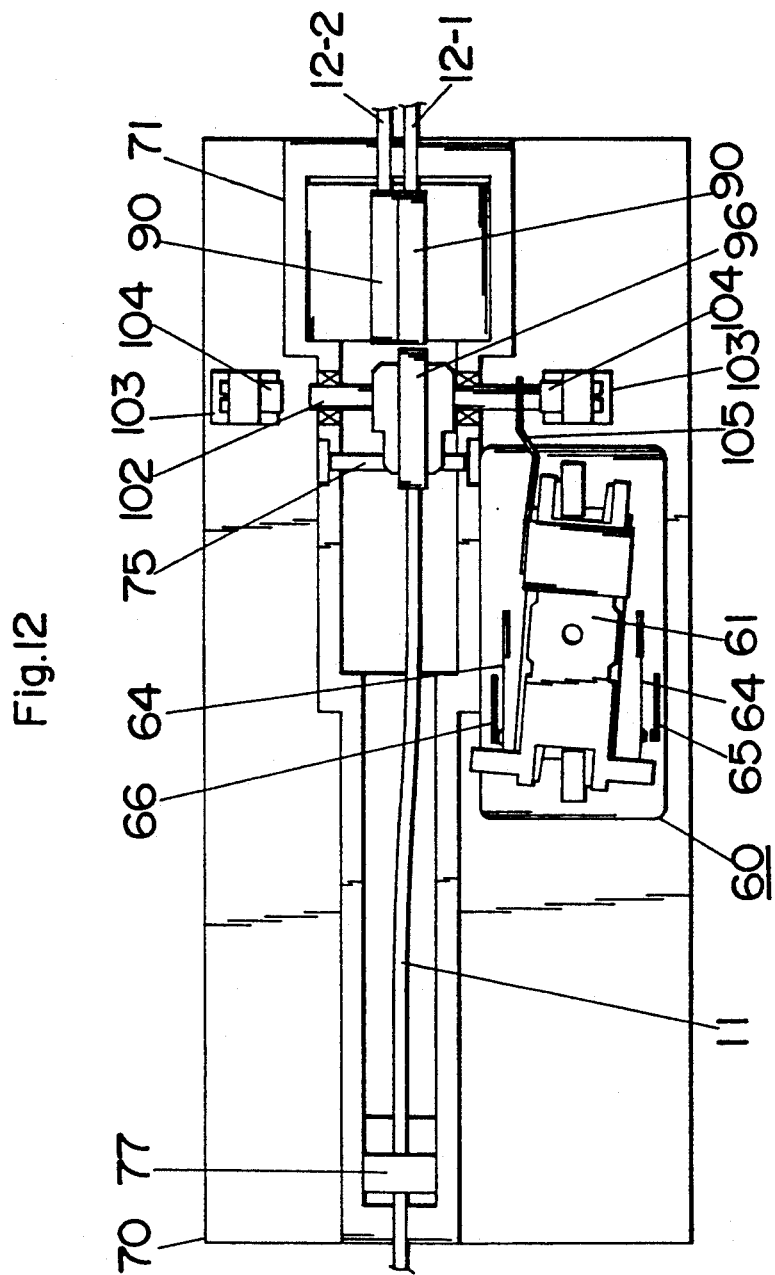
FIGS. 12 and 13 are views illustrating the operation of the above switching device with the output end of the first optical fiber moved into different positions, respectively.
Figure 13:
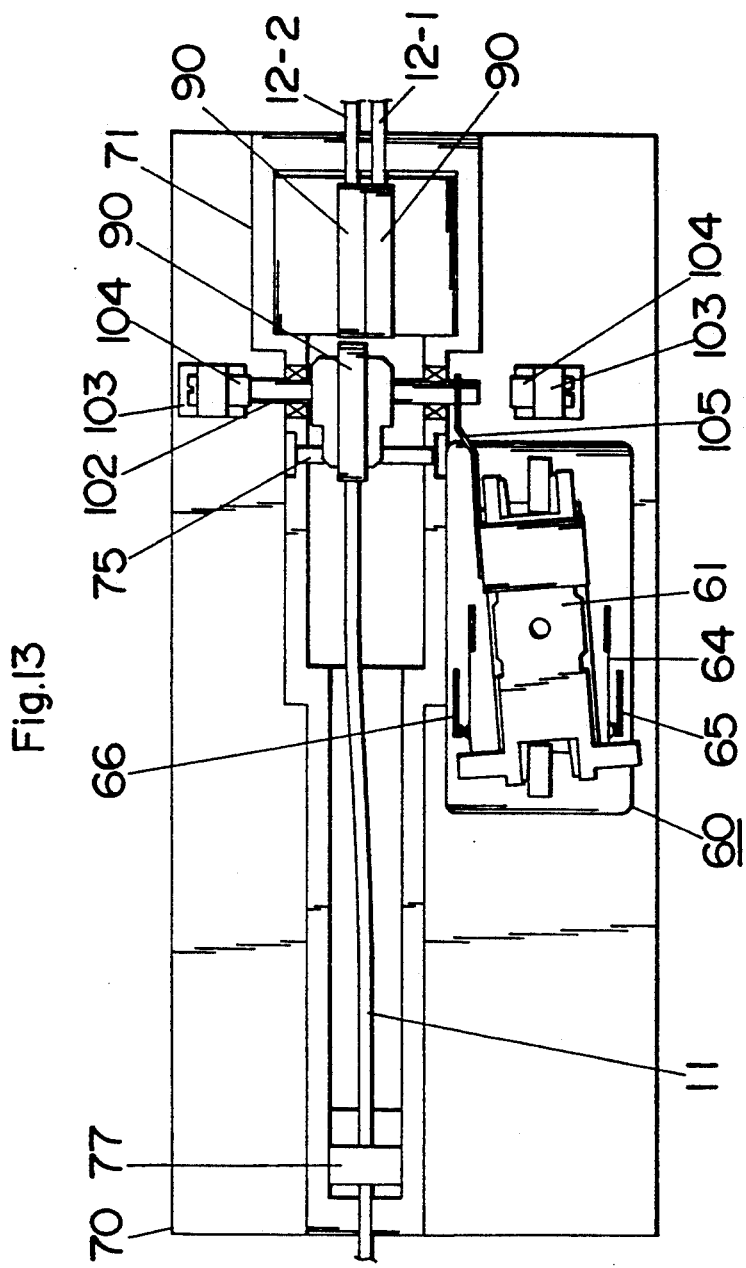

A pair of sliders 100 with wedge surfaces 101 are mounted on a block 78 fixed to the interior of the casing 71 to be slidable transversely of the longitudinal axis. The wedge surfaces 101 are positioned in supporting relation to the sleeves 90 at the input ends of the second optical fibers 12-1 and 12-2 in such a manner that the sliding movement of the slider 100 can change the vertical positions of the input ends, thereby enabling a vertical adjustment thereof to make the input ends in level with the output end of the first optical fiber 11. The carrier 80 is secured to a drive pin 102 which extends transversely through the side walls 74 in parallel with the shaft 75 and is axially movable together with the carrier 80. The drive pin 102 has its opposite ends projecting outwardly of the side walls 74 in an abuttable relation against adjustor screws 104 provided at corresponding posts 103 outwardly of the side walls 74 so as to adjust the stroke of the axial movement permitted to the drive pin 102. The driven pin 102 is coupled through a spring 105 to the armature 61 of the electromagnetic relay 60 so that it is driven thereby to move axially for shifting the carrier 80 between two horizontal positions in each of which the output end of the first optical fiber 11 is aligned with the input end of the corresponding one of the two second optical fibers 12-1 and 12-2. The exact alignment of the optical axis between the first and second fibers 11 and 12-1, 12-2 can be made through the horizontal adjustment of the drive pin 102 by the adjustor screws 104 and through the vertical adjustment of the second optical fibers 12-1 and 12-2 by the sliders 100, as explained hereinbefore. The relay 60 is a bistable polarized relay to move the armature 61 between two stable positions by selective energization of a coil 62 to the opposite polarity. That is, when the relay 60 is energized by a voltage of a give polarity, the armature 61 responds to move the carrier so and the output end of the first optical fiber 11 into coincidence with the input end of the one second optical fibers 12-1, as shown in FIG. 12, for directing the laser beam thereto. When the relay 60 is energized by a voltage of the opposite polarity, the armature 61 responds to move the carrier 80 and the output end of the first optical fiber 11 into coincidence with the input end of the other second optical fibers 12-2, as shown in FIG. 13, for directing the laser beam thereto. Disposed on the opposite sides of the armature 61 are spring contacts 64 which are actuated by the armature 61 to close and open complementary fixed contacts 65 and 66. The spring contacts 64 are cooperative with the fixed contacts 65 and 66 to define the above contact set 51 which provides the position signal indicating the position of the armature 61, i.e., that of the first optical fiber 11 in relation to the second optical fibers 12-1 and 12-2, and also whether the switching of the first optical fiber 11 has been completed to the destined one of the second optical fibers 12-1 and 12-2.

Figure 15:
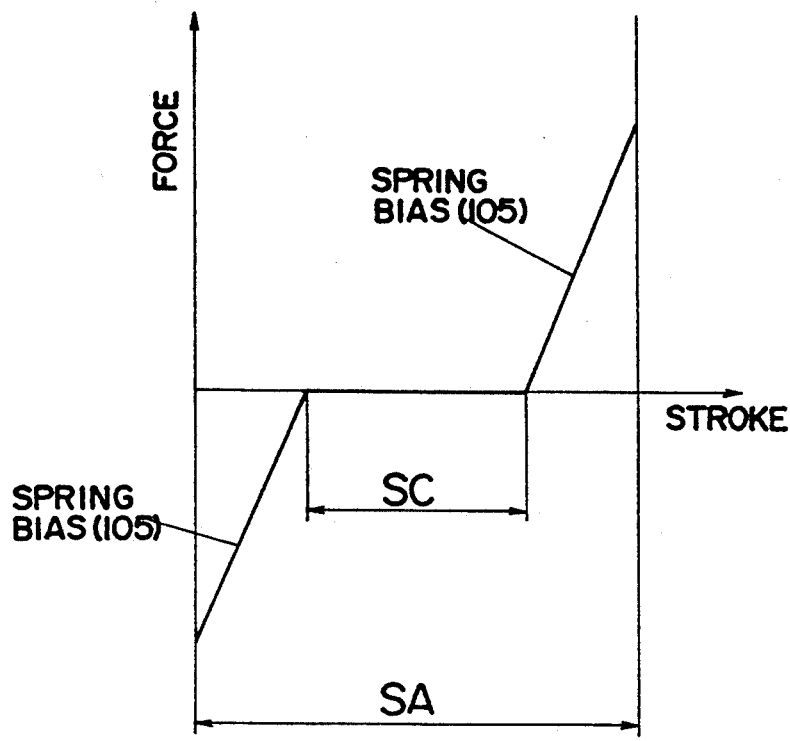
FIG. 15 is a graph illustrating a stroke-to-force relation acting on a carrier of the switching device from an electromagnetic relay and an associated spring.
Figure 16:
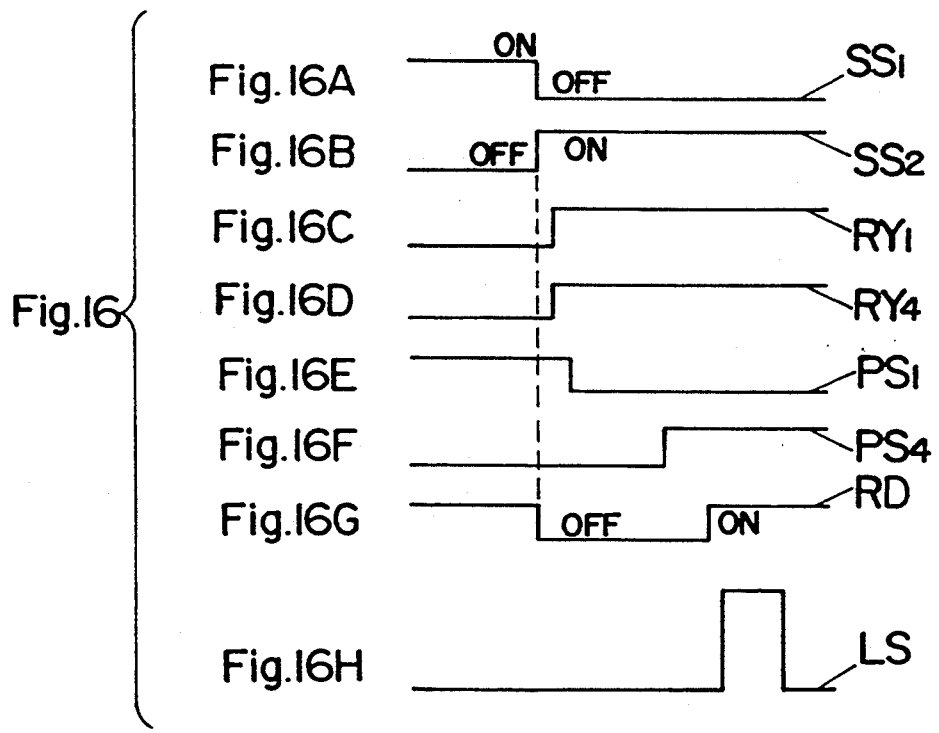
FIG. 16, composed of FIGS. 16A to 16H, is a waveform chart illustrating a controlled operation of the system.

The spring 105 extending from the armature 61 is connected at its bifurcated end to one end of the drive pin 102 outwardly of the side wall 74 to apply a spring bias to the axial movement of the drive pin 102. The spring bias is set to be lower than the attraction force of the armature 61 such that the position of the carrier 80, i.e., the output end of the first optical fiber 11 is determined by the armature stroke, while the spring bias assists the movement of the carrier 80 from one position to the other for improved response. It is noted in this connection that the stroke SA of the armature 61 is selected to be greater than the stroke SC of the carrier 80 as determined by the adjustor screws 104, as shown in FIG. 15. With this arrangement, the carrier stroke SC can be made free from possible variations in the armature stroke SA to assure an exact positioning of the carrier so and safe switching of the laser beam to the second optical fibers 12-1 and 12-2.

Figure 14:
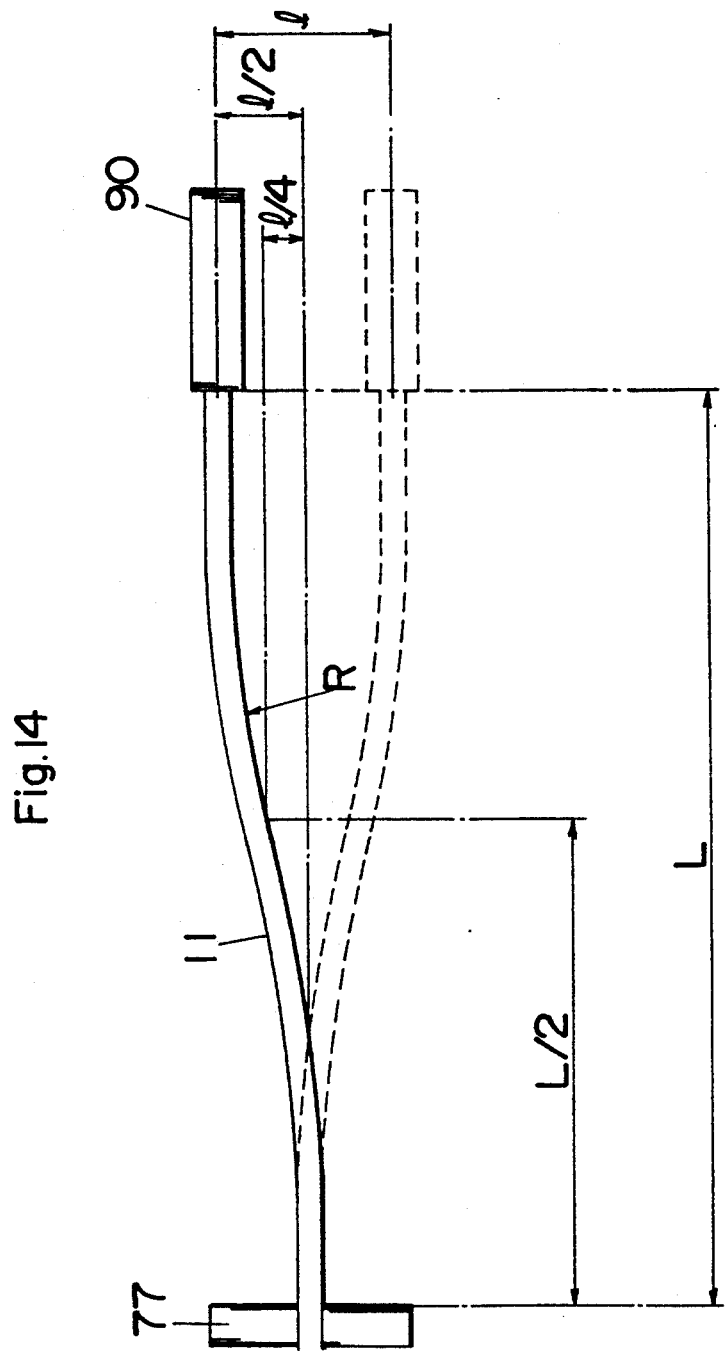
FIG. 14 is a schematic view illustrating a relation between a fixed point and a moving end of the first optical fiber within a housing of the switching device.

As shown in FIG. 14, the first optical fiber 11 is supported to the casing 71 in such a relation as to satisfy the following equation for freely flexing without causing any damage.

$$L \geq \sqrt{\left(2Rl - \frac{l^2}{4}\right)}$$

where L is a distance between the fixed point of the first optical fiber to the casing 71 and to the fixed point to the carrier 80, R is a minimum radius of curvature permitted to the optical fiber, and l is the carrier stroke SA between the two positions.

Figure 7:
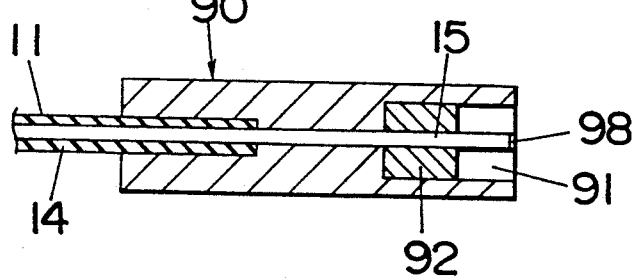
FIG. 7 is a sectional view of the heat-radiating sleeve at the output end of the first optical fiber.
Figure 8:
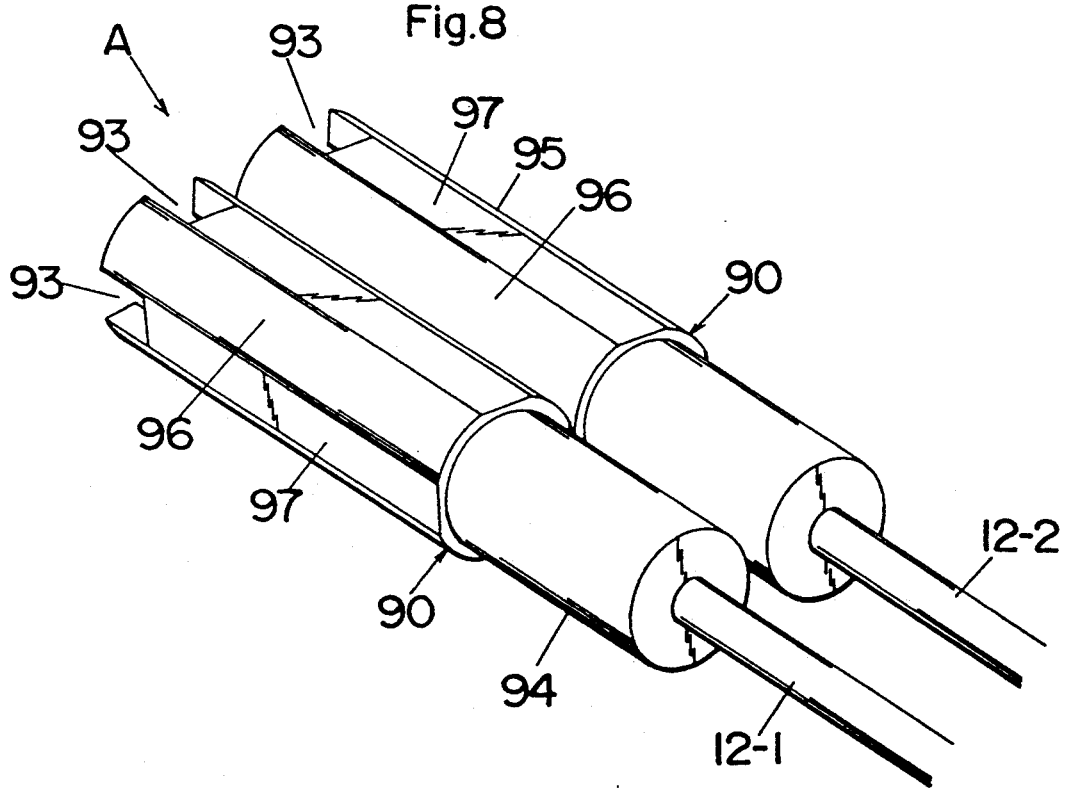
FIG. 8 is a perspective view of like heat-radiating sleeves fitted respectively around input ends of two second optical fibers.
Figure 9:
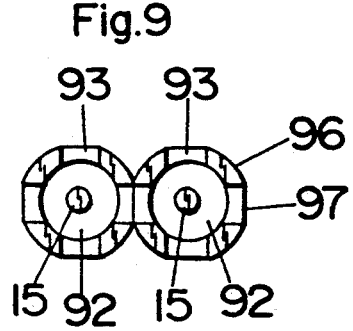
FIG. 9 is an end view of the heat-radiating sleeves around the input ends of the second optical fibers as viewed in a direction indicated by an arrow A of FIG. 8.
Figure 10:
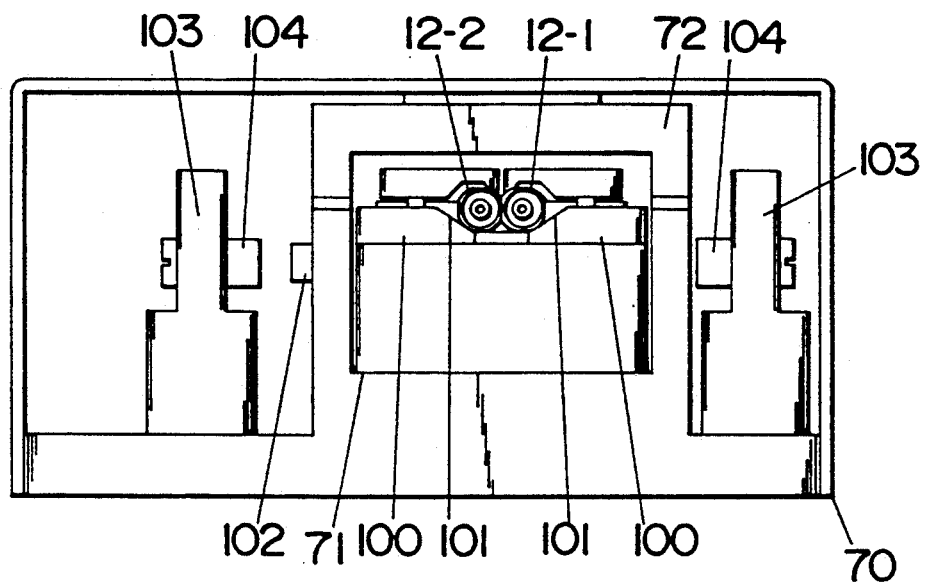
FIG. 10 is a sectional view taken along line X—X of FIG. 5.
Figure 11:
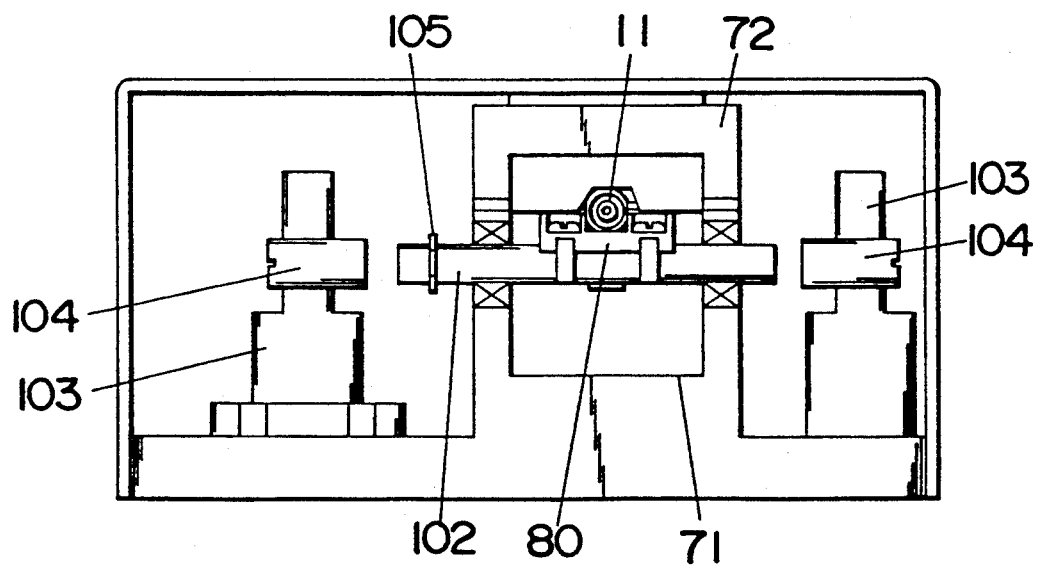
FIG. 11 is a sectional view taken along line Y—Y of FIG. 5.

As shown in FIGS. 6 to 9, the heat-radiating sleeve 90 is fitted around the output and input ends of the individual optical fibers over a certain length in such a manner as to extend from a nylon jacket 14 of the fiber to the free end portion where the jacket 14 is removed to expose a core 15. The sleeve 90 is made of a ceramic or metal having good thermal conductivity and rigidity to have a concave 91 in its free end, as best shown in FIG. 7. Fitted within the concave 91 is a sapphire 92 to surround the core 15 in such a manner as to expose the free end of the core 15. The end of the sleeve 90 is cut to have notches 93 which are circumferentially spaced about the core 15 and extend axially to a point adjacent the end face of the sapphire 92. With the notches 93 in the free end of the sleeve 90, a user is permitted to see through the notches 93 if the cores of the first and second optical fibers are in exact alignment with each other and to adjust the alignment readily by manipulating the sliders 100 and the adjustor screws 104. The exterior of the sleeve 90 is configured to have a cylindrical section 94 and a generally polygonal section 95 continuously extending therefrom to the free end and having a greater diameter than that of the cylindrical section 94. The polygonal section 95 is formed with rounded surfaces 96 alternating in a circumferential direction flattened surface 97 of which axial ends terminate in the notches 93, respectively. With the provision of the flattened surfaces 97, the second optical fibers 12-1 and 12-2 can be held close by the abutment of the respective flattened surfaces, as shown in FIGS. 8 and 9. The end of the core 15 is covered with an antireflection coating 98 having an optical thickness which is equal approximately to multiple of one-fourth (¼) of wavelength λ of the laser beam. The coating 98 is of a multilayer structure composed of layers of dielectric material and metal oxide so as to effectively prevent undesired reflection at the end face of the core 15.

Figure 17:
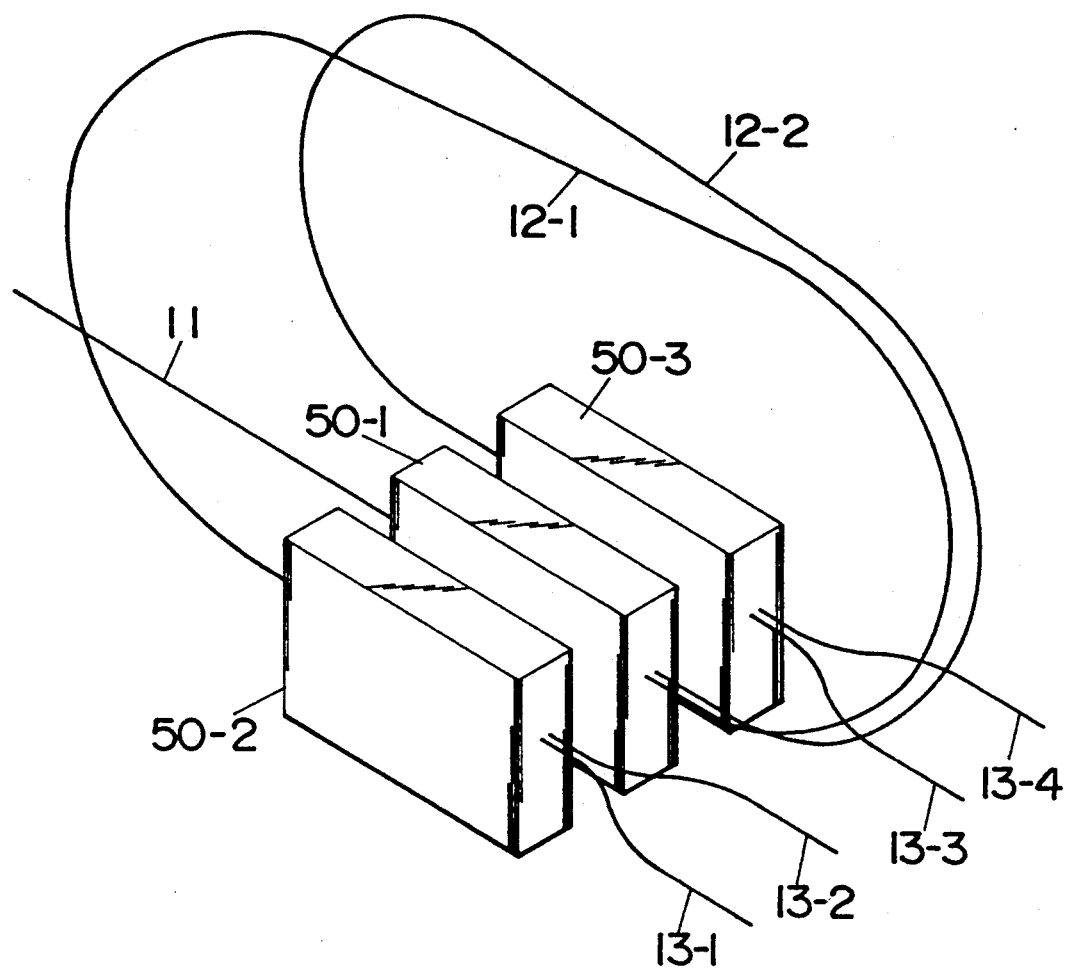
FIGS. 17 to 19 are schematic views illustrating different spacial arrangements of the three switching devices within the switching unit.
Figure 18:
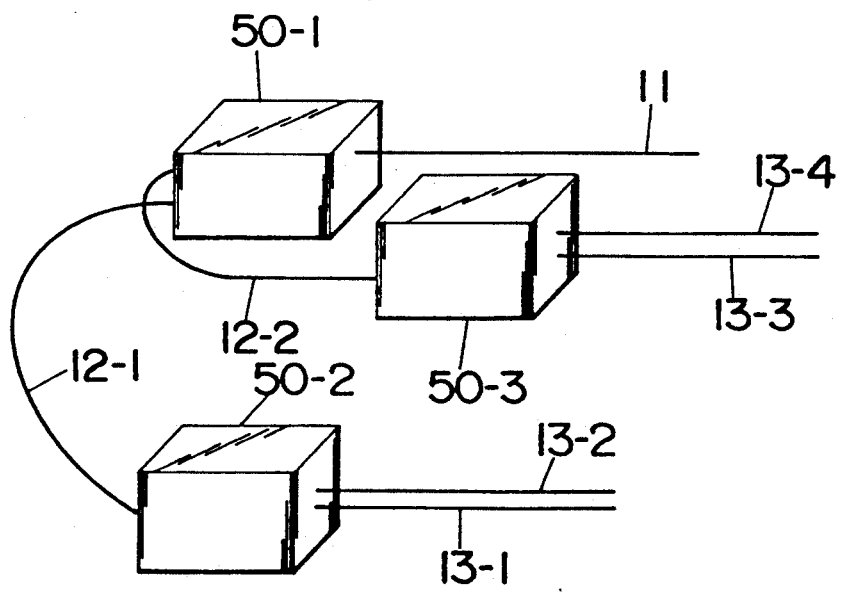
Figure 19:
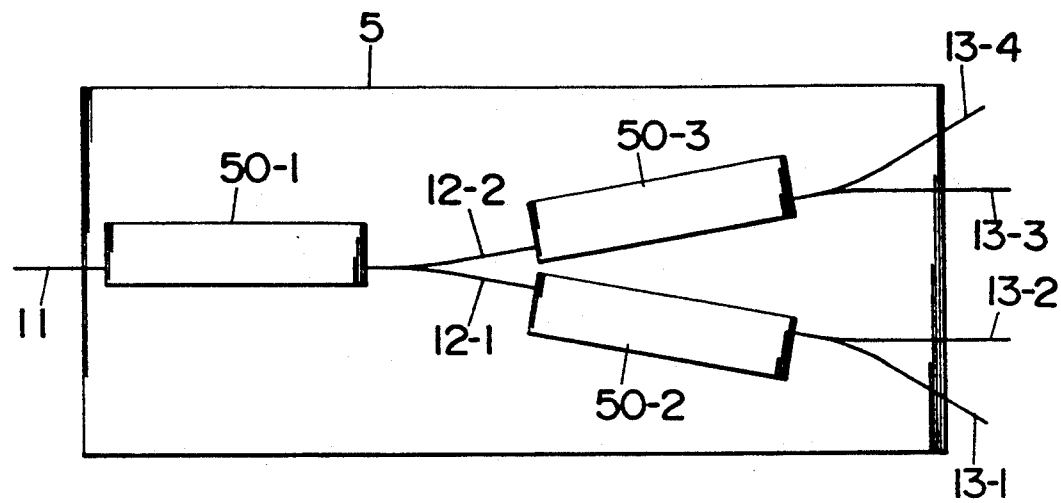

FIGS. 17 to 19 show useful schemes respectively for arranging the three switches 50-1 to 50-3 in a limited space within the switch unit 5. In FIG. 17, the three switches 50-1 to 50-3 are arranged in side-by-side relation with the second optical fibers 12-1 and 12-2 bent into loops for orienting the output ends of the switches 50-1 to 50-3 in the same direction. In FIG. 18, the primary switch 50-1 is vertically spaced from the secondary switches 50-2 and 50-3 arranged in the same horizontal plane with the second optical fibers 12-1 and 12-2 bent into loops for orienting the input end of the primary switch 50-1 and the output ends of the secondary switches 50-2 and 50-3 in the same direction toward the laser source and the work stations. In FIG. 19, the two secondary switches 50-2 and 50-3 are inclined in relation to the primary switch 50-1 with the second optical fibers 12-1 and 12-2 somewhat bent in order to closely dispose the secondary switches 50-2 and 50-3 to each other.

Figure 20:
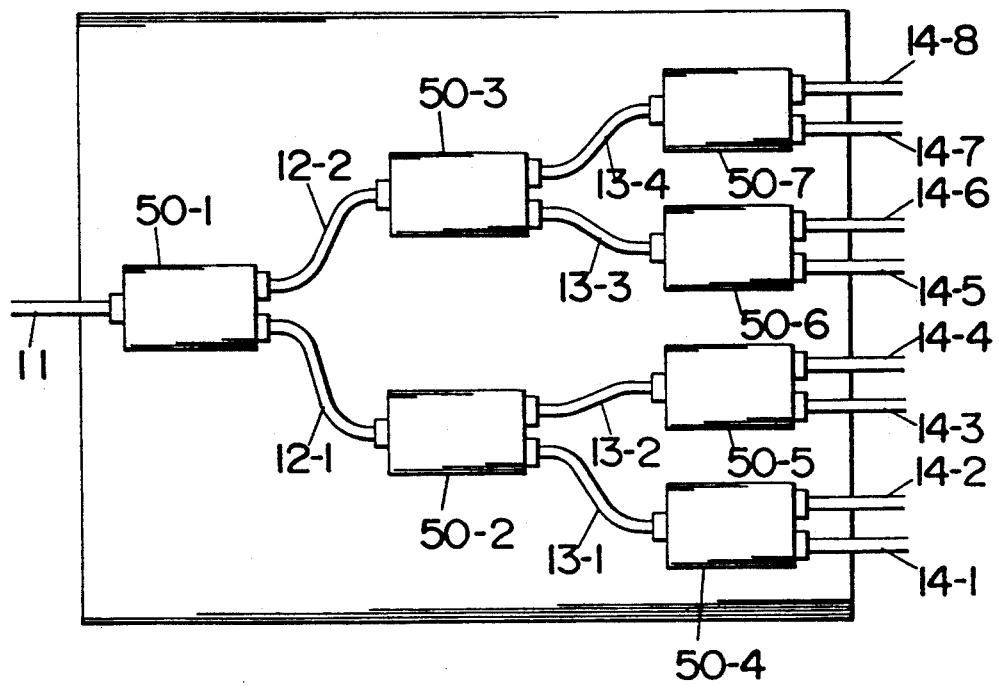
FIG. 20 is a schematic view illustrating another switching unit which may be employed in the invention and includes seven switching devices for directing the laser beam selectively to one of eight work stations.

Although the above embodiment is shown to utilize three switches for distributing the laser beam to four different work stations, the system of the present invention should not be understood to be limited to this particular arrangement and could be equally possible to distribute the laser beam to any desired number of work stations by adding a suitable number of like switches. For example, the system is expanded to distribute the laser beam to eight work stations, as shown in FIG. 20, by addition of four extra switches 50-4 to 50-7 after the secondary switches 50-2 and 50-3 and connecting the four switches 50-4 to 50-7 to the respective work stations by eight fourth optical fibers 14-1 to 14-8.

Figure 21:
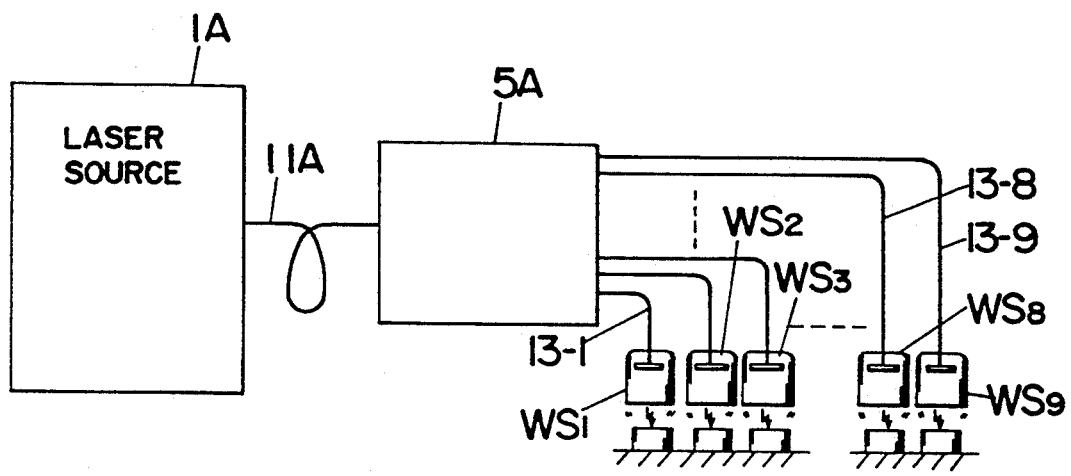
FIG. 21 is a schematic view illustrating an optical fiber switching system for laser welding in accordance with a second embodiment of the present invention.
Figure 22:
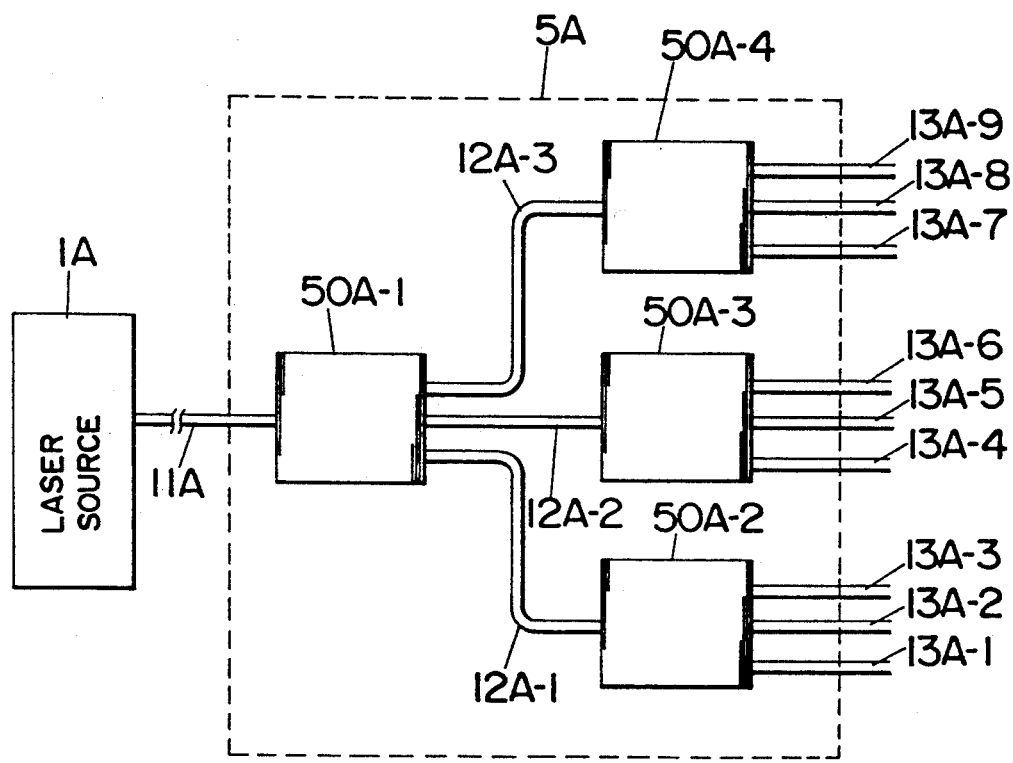
FIG. 22 is a schematic view illustrating a switching unit employed in the system of FIG. 21 to include four switching devices.

Second embodiment <FIGS. 21 to 23>

An optical fiber switching system for laser welding in accordance with a second embodiment of the present invention is configured to distribute the laser beam from a like laser source 1A selectively to one of nine work stations WS$_1$ to WS$_9$ through a switch unit 5A composed of four switching devices (hereinafter referred to simply as switches) 50A-1 to 50A-4 each capable of three way switching, as shown in FIGS. 21 and 22. That is, the switches 50A-1 to 50A-4 are each configured to have one input and three output and arranged in a cascade connection with the primary switch 50A-1 being connected to the laser source 1 through a first optical fiber 11A and connected to the three secondary switches 50A-2 to 50A-4 respectively through second optical fibers 12A-1 to 12A-3. The secondary switches 50A-2 to 50A-4 are connected to the work stations WS$_1$ to WS$_9$ through third optical fibers 13A-1 to 13A-9. The three-way switch structure is now discussed with reference to the primary switch 50A-1 for a simplicity purpose since the four switches 50A-1 to 50A-4 are of identical structure. As schematically shown in FIG. 23A, the switch 50A-1 includes a first carrier 110 and a second carrier 120 each movable between two positions within a sealed housing (not shown). The first carrier 110 supports an output end of the first optical fiber 11A and is connected to an armature 131 of a first electromagnetic relay 130 so that the output end of the first optical fiber 11A is driven to move between two positions. The second carrier 120 supports input ends of the three second optical fibers 12A-1 to 12A-3 in closely parallel relation to each other and is connected to an armature 141 of a second electromagnetic relay 140 so that the second carrier 120 is driven to move between two positions. With this structure, it is possible to connect the first optical fiber 11A selectively to any one of the three second optical fibers 12A-1 to 12-3 by controlling to move the armatures 131 and 141 of the first and second relays 130 and 140 in combination. As shown in FIG. 23A, when the armature 131 of first relay 130 is in the attracted position and at the same time when the armature 141 of the second relay 140 is in the non-attracted position, the first optical fiber 11A is connected to the second optical fiber 12A-1 shown as the lower fiber in the figure. As shown in FIG. 23B, when the armatures 131 and 141 of the first and second relays 130 and 140 are respectively in the non-attracted positions, the first optical fiber 11A is connected to the second optical fiber 12A-2 at the middle in the figure. As shown in FIG. 23C when the armatures 131 and 141 of the first and second relays 130 and 140 are respectively in the non-attracted and attracted positions, the first optical fiber 11A is connected to the second optical fiber 12A-3 shown as the upper fiber in the figure. The relay structure and the control of the system is identical to those of the first embodiment. However, the relay of different structure may be equally utilized in the present invention.

Figure 24:
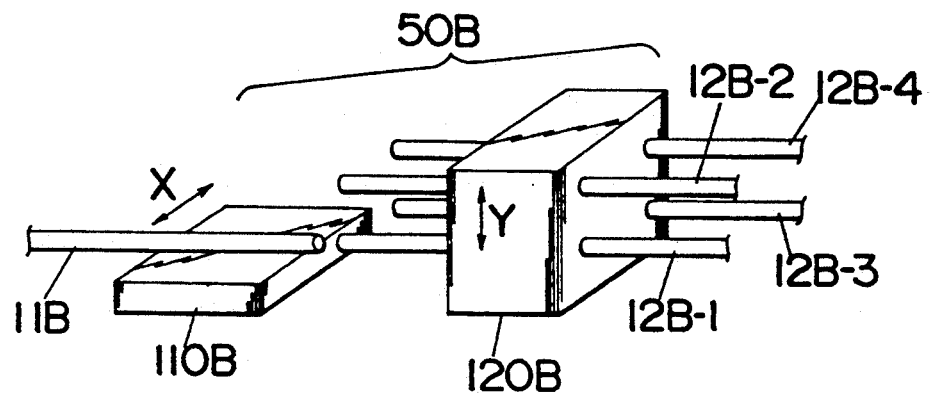
FIG. 24 is a schematic view illustrating a modified switching device which may be utilized in the present invention and includes a carrier supporting an array of four second optical fibers for selectively directing the laser beam to one of four second optical fibers.
Figure 25:
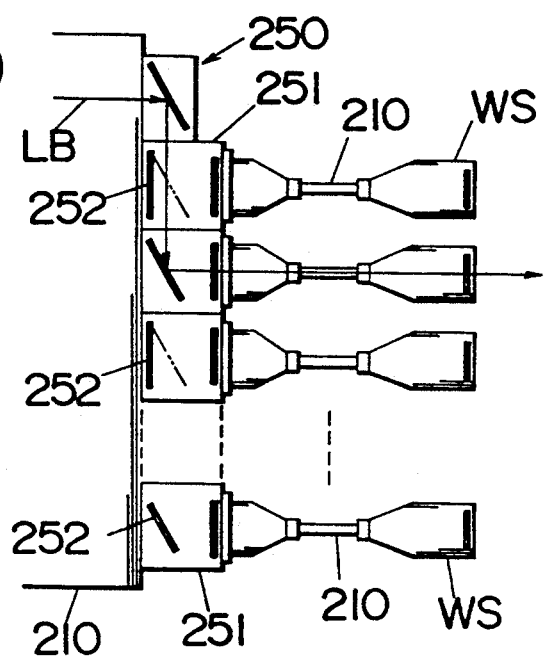
FIGS. 25 and 26 are schematic views illustrating prior switching system for laser welding.
Figure 26:
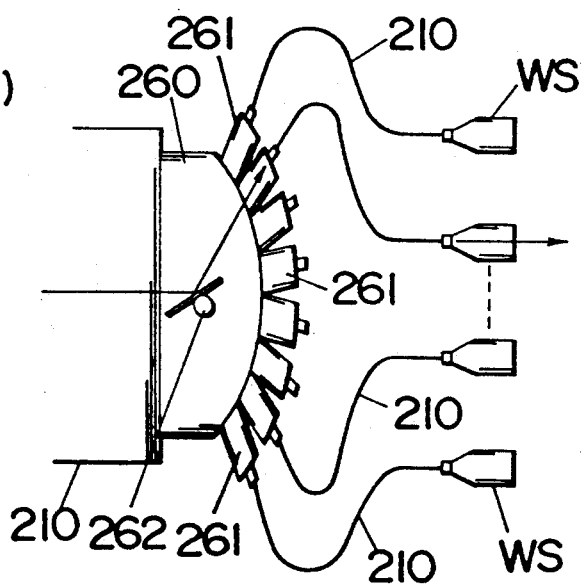

FIG. 24 illustrates in a greatly schematic representation a switching device 50B which may be utilized in the above system to effect four-way switching for selective distribution of the laser beam in the above system. The switch device 50B comprises a first carrier 110B and a second carrier 120B which are movable between two positions, respectively in the horizontal and vertical directions as indicated by arrows X and Y. The first carrier 110B supports the output end of a single optical fiber 11B and is driven to move the output end between two horizontal positions by a like relay (not shown). The second carrier 120B supports the input ends of four optical fibers 12B-1 to 12D-4 Which are arranged in two parallel rows each composed of two of the fibers. The second carrier 120B is connected to a like relay to be vertically movable between two positions such that the optical fiber 11B on the first carrier 110B can be brought into closely face-to-face connection selectively to any one of the four fibers 12B-1 to 12B-4 on the second carrier 120B by controlling to change the horizontal and vertical positions of the first and second carriers 110B in combination.

What is claimed is:

1. A switching system for selectively distributing a laser beam to one of a plurality of welding stations to effect a laser welding thereat, said system comprising:
   a laser source generating said laser beam;
   a first optical fiber extending from said laser source to direct said laser beam therethrough;
   a pair of second optical fibers leading to said welding stations, respectively;
   a switching device for connecting said first optical fiber to a selected one of said second optical fibers so as to pass said laser beam to said selected second optical fiber for enabling the laser welding at the corresponding welding station, said switching device comprising:
   a housing having a longitudinal axis and holding input ends of said second optical fibers in parallel relation with said longitudinal axis;
   a carrier supporting an output end of said first optical fiber and linearly movable together therewith within said housing in a direction perpendicular to said longitudinal axis such that the output end of said first optical fiber comes into and out of close end-to-end facing relation with the input ends of said second optical fibers; and
   an electromagnetic relay having an armature movable between two positions, said armature operatively connected to move said carrier linearly for aligning the output end of said first optical fiber to the input end of a selected one of the second optical fibers, thereby directing said laser beam from aid first optical fibers, thereby directing said laser beam from said first optical fiber through the selected one of said second optical fibers, heat radiating sleeve means covering at least a portion of the circumference of the output end of said first optical fiber end and at least a portion of the input ends of said second optical fibers.

2. A switching system as set forth in claim 1, wherein said heat-radiating sleeve means is made of a ceramic.

3. A switching system as set forth in claim 1, wherein said heat-radiating sleeve means is made of a heat-resistance rigid metal.

4. A switching system as set forth in claim 1, wherein said heat-radiating sleeve means is formed with at least one notch through which a core of the corresponding one of the first and second optical fibers can be viewed.

5. A switching system as set forth in claim 1, further including adjustor means for adjusting an optical axis of the first optical fiber in coincidence with that of the second optical fiber.

6. A switching system as set forth in claim 1, wherein said electromagnetic relay is of a bistable operation to attract said armature to either of the two positions, said armature connected to said carrier through a spring applying to the carrier a spring load which is less than an attraction force of the armature.

7. A switching system as set forth in claim 1, wherein said first and second optical fibers are formed on end faces of the output and input ends respectively with antireflection coatings having an optical thickness which is equal approximately to a multiple of a one-fourth wavelength of the laser beam.

8. A switching system as set forth in claim 7, wherein said coating is in the form of a multilayer comprising layers of dielectric material and a metal oxide.

9. A switching system for selectively distributing a laser beam to one of a plurality of welding stations to effect a laser welding thereat, said system comprising:
a laser source generating said laser beam;
a first optical fiber extending from the laser source to direct said laser beam therethrough;
a pair of second optical fibers leading to said welding stations, respectively;
a switching device for connecting said first optical fiber to a selected one of said second optical fibers so as to pass said laser beam to said selected second optical fiber for enabling the laser welding at the corresponding welding station,
said switching device comprising:
a housing having a longitudinal axis and holding input ends of said second optical fibers in parallel relation with said longitudinal axis, respectively;
a carrier supporting an output end of said first optical fiber and linearly movable together therewith within said housing in a direction perpendicular to said longitudinal axis such that the output end of said first optical fiber comes into and out of close end-to-end facing relation with the input ends of said second optical fibers; and
an electromagnetic relay with an armature operatively connected to move said carrier linearly between two positions in each of which the output end of said first optical fiber comes into close end-to-end facing relation with the input end of each of said second optical fibers, thereby directing said laser beam from said first optical fiber through a selected one of said second optical fibers in end-to-end facing relation with said first optical fiber;
control means for enabling and disabling the generation of said laser beam at said laser source,
hazard sensor means provided within said switching device to detect a leakage of said laser beam at the connection between said first and second optical fibers and to issue a hazard signal to said control means upon detection of the leakage of said laser beam;
said control means responding to said hazard signal by disabling said laser source so as to cease generating said laser beam.

10. A switching system as set forth in claim 9, including at least one shutter for interrupting said laser beam and a position detector for detecting the position of said armature of said relay and providing to said control means a change-over signal when the armature completes a changeover from one position to another, said shutter being controlled by said control means such that it is opened only when said hazard signal is not received and, at the same time, said change-over signal is received.

11. A switching system as set forth in claim 9, wherein each of said welding stations is provided with a shutter for interrupting said laser beam directed through the corresponding second optical fiber and a position detector is included to detect the position of said armature of said relay and provide to said control means a change-over signal when said armature completes a change-over from one position to the other, said control means, in response to receiving said changeover signal, operating to open one of said shutter corresponding to the one of said second optical fibers selected to be connected to said first optical fiber, and
in an absence of said changeover signal, said control means controlling to disable the generation of said laser beam until said changeover signal is received.

12. A switching system for selectively distributing a laser beam to one of a plurality of welding stations to effect a laser welding thereat, said system comprising:
a laser source generating said laser beam;
a first optical fiber extending from said laser source to direct said laser beam therethrough;
a set of three second optical fibers leading to said welding stations, respectively;
a switching device for connecting said first optical fiber to a selected one of said second optical fibers so as to pass said laser beam to said selected second optical fiber for enabling the laser welding at the corresponding welding station,
said switching device comprising:
a housing having a longitudinal axis;
a first carrier supporting an output end of said first optical fiber and linearly movable within said housing in a direction perpendicular to said longitudinal axis;
a second carrier supporting input ends of said second optical fibers in parallel relation to each other and linearly movable together therewith within said housing in a direction perpendicular to said longitudinal axis, the input ends of said second optical fibers arranged in an evenly spaced relation within a plane;
heat radiating sleeve means covering at least a portion of the circumference of the output end of the first optical fiber and at least a portion of the input ends of the second optical fibers;
a first electromagnetic relay with an armature operatively connected to move said first carrier linearly between two positions;

a second electromagnetic relay with an armature operatively connected to move said second carrier linearly between two positions such that the output end of said first optical fiber in one of the two positions comes into close end-to-end facing relation selectively with the output end of one of two adjacent second optical fibers and the output end of said first optical fiber in the other position comes into close end-to-end facing relation selectively with the output end of one of another two adjacent second optical fibers.

13. A switching system for selectively distributing a laser beam to one of a plurality of welding stations to effect a laser welding thereat, said system comprising:
   a laser source generating said laser beam;
   a first optical fiber directing said laser beam therethrough;
   a set of four second optical fibers leading to said welding stations, respectively;
   a switching device for connecting said first optical fiber to a selected one of said second optical fibers so as to pass said laser beam to said selected second optical fiber for enabling the laser welding at the corresponding welding station, said switching device comprising:
   a housing having a longitudinal axis;
   a fist carrier supporting an output end of said first optical fiber and linearly movable within said housing in a direction perpendicular to said longitudinal axis;
   a second carrier supporting input ends of said second optical fibers in such a manner that said input ends are arranged in two parallel rows each composed of two of said second optical fibers, said second carrier movable together with the input ends of said second optical fibers in a direction perpendicular to said longitudinal axis and perpendicular to a plane in which said first carrier moves;
   heat radiating sleeve means covering at least a portion of the circumference of the output end of the first optical fiber and at least a portion of the input ends of the second optical fibers;
   a first electromagnetic relay with an armature operatively connected to move said first carrier linearly between two horizontal positions;
   a second electromagnetic relay with an armature operatively connected to move said second carrier linearly between two vertical positions in each of which the input end of each of said second optical fibers comes into close end-to-end facing relation selectively with the output end of said first optical fiber in each of its horizontal positions, thereby directing said laser beam selectively to one of said four second optical fibers from said first optical fiber.

* * * * *